United States Patent [19]

Takahashi

[11] 4,375,093

[45] Feb. 22, 1983

[54] INTERMUSIC DETECTING CIRCUIT FOR AUTOMATIC MUSIC SELECTING DEVICE

[75] Inventor: Shinya Takahashi, Tokorozawa, Japan

[73] Assignee: Pioneer Electronic Corporation, Tokyo, Japan

[21] Appl. No.: 284,022

[22] Filed: Jul. 17, 1981

[30] Foreign Application Priority Data

Jul. 17, 1980 [JP] Japan ................... 55-96871

[51] Int. Cl.³ .................... G11B 3/38; G11B 17/06
[52] U.S. Cl. ......................... 369/41; 369/33; 369/217; 369/226; 369/233
[58] Field of Search ............ 369/33, 41, 216, 217, 369/225, 226, 231, 233

[56] References Cited

U.S. PATENT DOCUMENTS 3,937,903  2/1976  Osann ................... 369/41
4,079,261  3/1978  Mullin .................. 369/41
4,166,621  9/1979  Isaacson et al. ........ 369/33
4,230,323  10/1980 Tsuji et al. ........... 369/33

Primary Examiner—Steven L. Stephan
Attorney, Agent, or Firm—Sughrue, Mion, Zinn, Macpeak and Seas

[57] ABSTRACT

An intersong detecting circuit for an automatic music selecting device for a record player in which intersong intervals are accurately detected even for a disc having irregular reflectivities or between discs of different reflectivities. An intersong sensor detects intersong intervals between adjacent songs on a recording disc. The output signal from the intersong sensor is sampled and held at a rate determined by a leading-in time/reproducing time time-constant switching signal. The sampled-and-held signal is compared with the output of the sensor to produce a differential signal and an intersong identification signal is produced when the differential signal exceeds a predetermined threshold value.

6 Claims, 18 Drawing Figures

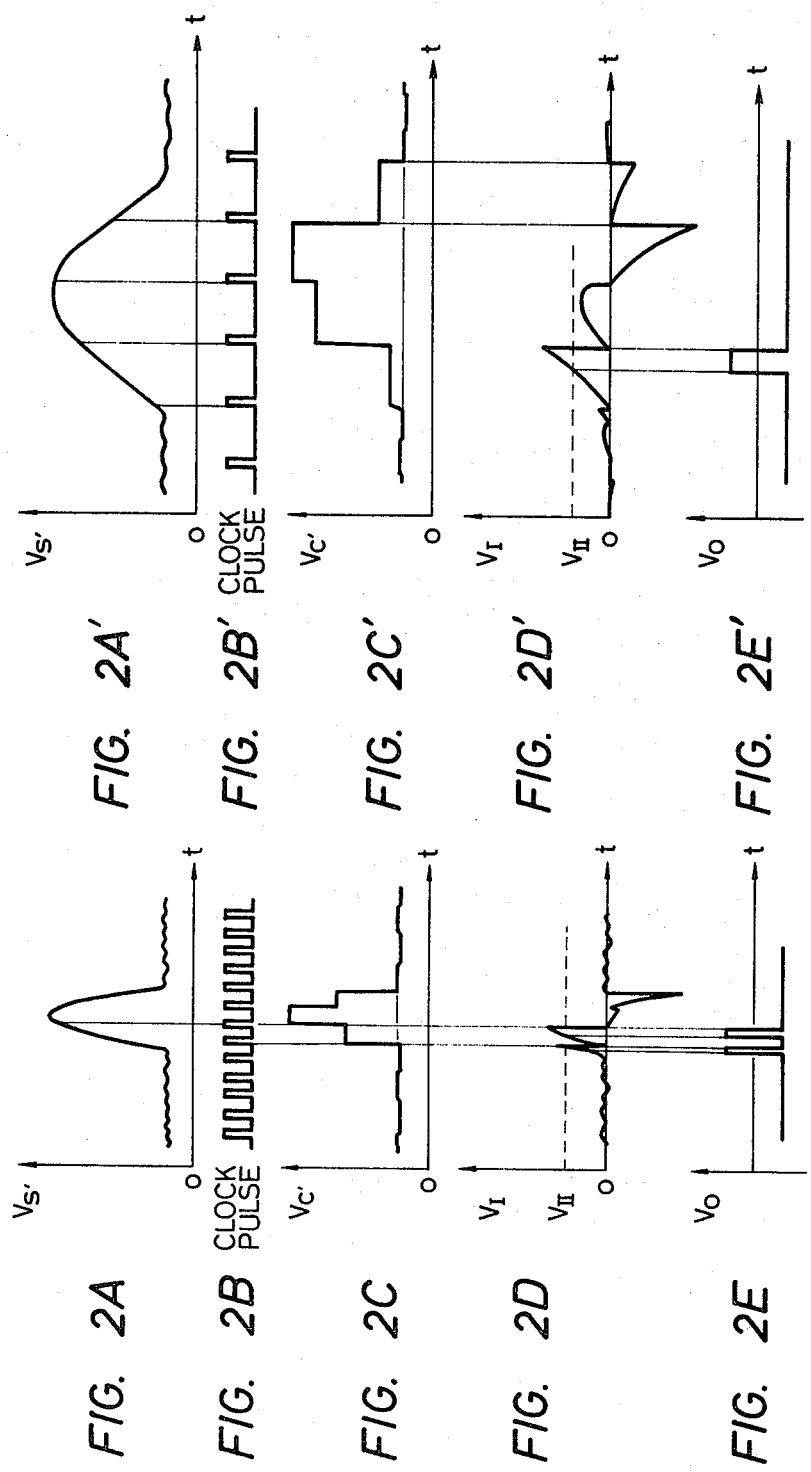

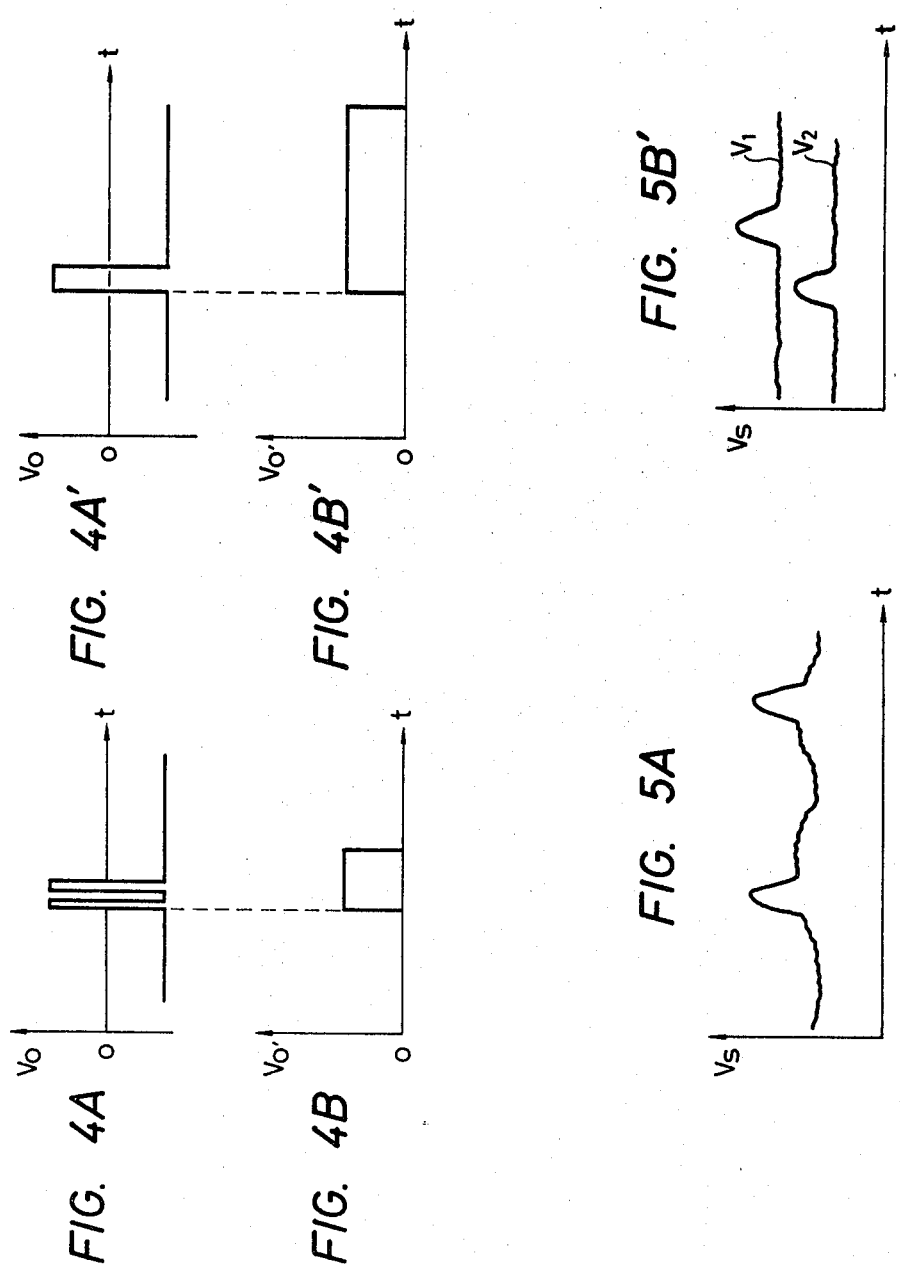

INTERMUSIC DETECTING CIRCUIT FOR AUTOMATIC MUSIC SELECTING DEVICE

BACKGROUND OF THE INVENTION

The present invention relates to an automatic music or song selecting device for automatically selecting any arbitray music or song of two or more recorded on one side of a recording disc. More particularly, the invention relates to an intermusic or intersong detecting circuit for detecting the intermusic or intersong interval between adjacent songs by processing a signal from an intersong sensor for the automatic music or song selecting device.

In a conventional automatic music or song selecting device, a pickup cartridge incorporates an intersong detector having a light source and a photodetector and which is mounted in the vicinity of the tip of the stylus of the cartridge. When the pickup cartridge thus constructed is positioned adjacent the surface of the recording disc, the light emitted from the light source and reflected from the surface of the recording disc is detected by the photodetector. The intersong sensor detects the space or interval between adjacent songs on the disc on the basis of variations in the light reflected from the recording disc and accordingly produces an output signal varying in magnitude in accordance with the variations in the reflected light.

Such an automatic music selecting device is desirably capable not only of selecting one of a plurality of songs recorded on the recording disc, but also should be capable of selecting a plurality of sequential songs designated externally. In such a case, the automatic music selecting device must detect subsequent intersong intervals while playing another song. In case, for example, that the second and fifth songs are designated, the intersong sensor is in a leading-in state over the recording disc until the sensor arrives at the intersong interval between the first and the second songs and until the sensor is introduced into the intersong interval between the fourth and the fifth songs upon completion of playing of the second song on the disc. In this state, the intersong sensor must move at a considerably high speed together with the pickup cartridge. The intersong sensor, on the other hand, is in a playing or reproducing state while the cartridge is playing the second song and while the cartridge is playing the fifth song. In this case, the intersong sensor moves at slower speed together with the pickup cartridge than that during the leading-in time.

As a consequence, the signal waveform produced from the intersong sensor is different between the leading-in time and the reproducing time. Accordingly, the output signal itself from the intermusic sensor cannot be utilized directly as an intersong detection signal for controlling the automatic song selecting device.

To correct this problem, the conventional automatic music selecting device employed an intersong detecting circuit has employed a BPF (band-pass filter) the time constant of which is switched between the leading-in time and the reproducing time of the recording disc. The output signal from the intersong sensor is thus processed by the BPF for detection.

Since such a conventional intersong detecting circuit, however, must employ a BPF with a very large time constant for the reproducing time, a long time delay is involved, and accordingly typically more than several tens of seconds are required until the detecting circuit returns to the normal state after it detects an intersong interval.

Further, if there is an irregularity in the reflectivity of the surface of the recording disc or if there are different reflectivities in recording discs, such as between a black recording disc and a red recording disc, the conventional intersong sensor (as disclosed in Japanese Published Patent Application No. 43-5249, published 1968 cannot accurately detect intersong intervals between adjacent songs on recording discs.

SUMMARY OF THE INVENTION

Accordingly, a primary object of the invention is to provide an intersong detecting circuit for an automatic music selecting device in which intersong intervals can be detected without difficulty even on recording discs having irregular or different reflectivities.

A still further object of the invention is to provide an intersong detecting circuit for an automatic music selecting device in which accurate operations are carried out in detecting the intersong intervals between adjacent songs on a recording disc.

In accordance with these and other objects of the invention, there is provided an intersong detecting circuit for detecting intersong intervals between adjacent songs for an automatic music selecting device in which the intersong interval between adjacent songs can be detected for both leading-in times and reproducing times by merely switching a sampling frequency or period of the output signal from the intersong sensor, thereby eliminating all of the aforementioned disadvantages of the conventional intersong detecting circuit.

Further, the invention provides an intersong detecting circuit for an automatic music selecting device in which there is no time delay in detecting intersong intervals between adjacent songs on a recording disc by eliminating components causing long time delays and providing a capacitor for holding a voltage in a sample-and-hold circuit in a single processing circuit.

The nature, principle and utility of the invention will become more apparent from the following description when read in conjunction with the accompanying drawings.

BRIEF DESCRIPTION OF THE DRAWINGS

In the accompanying drawings:

FIGS. 2A through 2E and 2A' through 2E' are graphical representations indicating signal waveforms at various points in the circuit shown in FIG. 1 for both leading-in times and playing or reproducing times;

FIGS. 4A and 4B and 4A' and 4B' are graphical representations indicating the input and output waveforms of the one-shot multivibrator shown in FIG. 3 for both leading-in times and reproducing times; and FIGS. 5A and 5B are graphical representations indicating output waveforms of the intersong sensor of the invention in cases where there is an irregularity in the reflectivity of the recording disc and for discs with different reflectivities.

DESCRIPTION OF THE PREFERRED EMBODIMENT

A preferred embodiment of an intersong detecting circuit for an automatic music or song selecting device constructed according to the invention will be described with reference to the drawings, particularly to FIG. 1.

Figure 1:
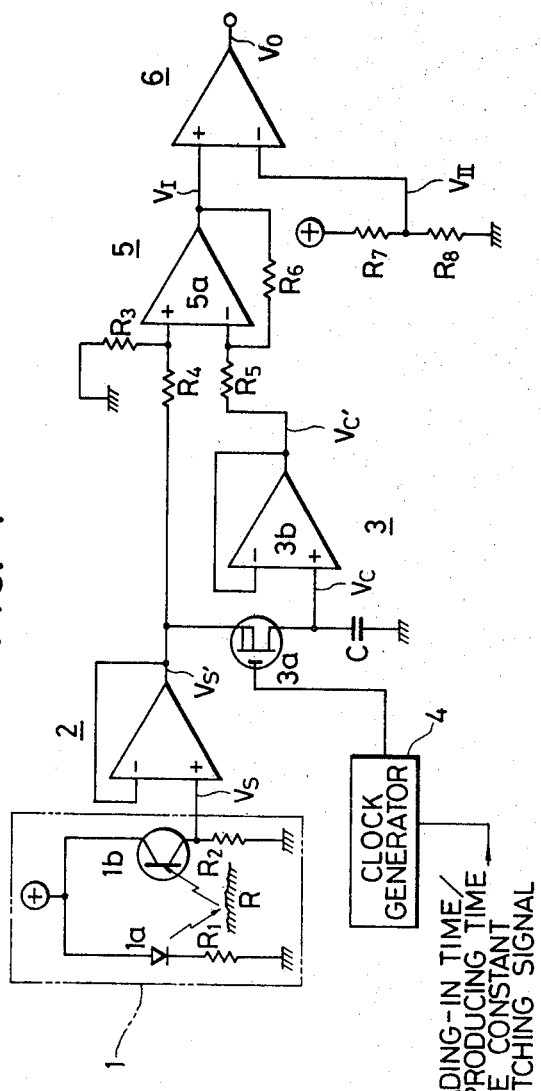
FIG. 1 is a schematic circuit diagram showing a preferred embodiment of an intersong detecting circuit for an automatic music selecting device constructed according to the present invention.

In FIG. 1, the automatic song selecting device advantageously includes an intermusic or intersong sensor 1. The sensor 1 includes a resistor $R_1$ connected at one end to ground, a light emitting diode 1a provided as a light source connected at one end to the other end of the resistor $R_1$ and at the other end to a positive terminal of a power source, a resistor $R_2$ connected at one end to ground, and a phototransistor 1b provided as a photodetector connected at one end to the other end of the resistor $R_2$ and at the other end to the positive terminal of the power source.

Light emitted from the diode 1a is directed to the recording disc R and is reflected from the disc R. The reflected light is applied to the phototransistor 1b, which thus produces an output signal varying in accordance with the amount of light received. The output from the phototransistor 1b is applied from the connecting point between the phototransistor 1b and the resistor $R_2$.

The intersong detecting circuit further includes a buffer amplifier 2 which operates in a voltage follower mode. The output signal $V_s$ from the phototransistor 1b in the intersong sensor 1 is applied to the non-inverting input of the buffer amplifier 2, which sequentially produces an output signal $V_s'$ similar in waveform to the output signal $V_s$ from the phototransistor 1b. The output from the buffer amplifier 2 is fed back to the inverting input of the buffer amplifier 2.

The intersong detecting circuit also includes a sample-and-hold unit 3, which includes a switching element 3a which is turned on and off at a designated sampling period or frequency, a capacitor C and an operational amplifier 3B. The output signal $V_s'$ from the buffer amplifier 2 is in turn applied to the non-inverting input of the switching element 3a, which sequentially samples the output signal $V_s'$ from the buffer amplifier 2 and holds the sampled signal in accordance with clock pulses applied from a clock generator 4, which will be described below in detail, at the clock input of the switching element 3a. The capacitor C is connected between the output terminal of the switching element 3a and ground.

The sampled output signal $V_c$ from the switching element 3a held by the capacitor C is applied to the non-inverting input of the operational amplifier 3b. The amplifier 3b in response thereto produces an output signal $V_c'$ similar in waveform to the sampled signal $V_c$ from the switching element 3a. The output from the operational amplifier 3b is fed back to the inverting input of the amplifier 3b.

The intersong detecting circuit further includes a clock generator 4 which produces clock pulses having different periods or frequencies depending upon the leading-in time and the playing or reproducing time. These clock pulses are applied to the clock input of the switching element 3a in the sample-and-hold unit 3 to thereby determine the sampling period or frequency of the sample-and-hold unit 3.

The intersong detecting circuit further includes a differential amplifier 5 which in turn includes an operational amplifier 5a and resistors $R_3$ through $R_6$ connected as shown. The output signal $V_s'$ from the buffer amplifier 2 is applied through the resistor $R_4$ to the non-inverting input of the operational amplifier 5a. A resistor $R_3$ is connected between this point and ground. On the other hand, the sampled output signal $V_c'$ from the operational amplifier 3b in the sample-and-hold unit 3 is also applied to the inverting input of the operational amplifier 5a through the resistor $R_5$. The output of the operational amplifier 5a is fed back through the resistor $R_6$ to the inverting input of the operational amplifier 5b. The operational amplifier 5a thus forms a differential amplifier 5 which serves to compare the output signal $V_s'$ from the buffer amplifier 2 with the output signal $V_c'$ from the sample-and-hold unit 3 in magnitude and to thereby produce a differential signal $V_I$ corresponding to the difference between the output signal $V_s'$ from the buffer amplifier 2 and the output signal $V_c'$ from the sample-and-hold unit 3.

The inversong detecting circuit moreover includes a comparator 6, which in turn includes an operational amplifier as shown, and a threshold setting unit which includes series-connected resistors $R_7$ and $R_8$ connected between the positive and negative or ground terminals of the power source for setting a threshold value or voltage level $V_{II}$ from the connecting point between the resistors $R_7$ and $R_8$. The differential signal $V_I$ from the operational amplifier 5a in the differential amplifier 5 is in turn applied to the non-inverting input of the comparator 6. On the other hand, the threshold voltage level $V_{II}$ from the threshold setting unit is applied to the inverting input of the differential amplifier 6. The differential amplifier 6 thus produces an output signal $V_O$ when the differential signal $V_I$ from the amplifier 5a is higher than the threshold voltage $V_{II}$ from the threshold setting unit.

The operation of the intersong detecting circuit thus constructed will be described with reference to voltage signal waveforms at various points in the circuit as indicated in FIGS. 2A through 2C and 2A' through 2E'.

If the automatic music selecting device is operating in a leading-in state, the intersong sensor 1 of the automatic music detecting device mounted in the vicinity of the stylus of the pickup cartridge will produce a voltage signal $V_s$ varying similarly to the voltage signal waveform $V_s'$ indicated in FIG. 2A, which is a low-level ripple when the sensor 1 confronts a modulated groove portion on the recording disc and which is at a pulse-like high level when the sensor 1 confronts an intersong interval where no modulated groove is present.

The voltage signal $V_s$ from the intersong sensor 1 is in turn applied to the buffer amplifier 2 which in response thereto produces the amplified voltage signal $V_s'$ similar in waveform to the input voltage signal $V_s$.

Then, the amplifier voltage output signal $V_s'$ from the buffer amplifier 2 is in turn applied to the switching element 3a in the sample-and-hold unit 3. The signal $V_s'$ thus applied is sampled by the switching element 3a which samples the received signal $V_s'$ in accordance with the clock pulses indicated in FIG. 2B from the clock generator 4 which are applied to the switching element 3a. The sampled voltage signal $V_c$ outputted from the switching element 3a is held by the capacitor C connected to the output of the switching element 3a. The sampled voltage signal $V_c$ held by the capacitor C is similar to the voltage waveform $V_c$ indicated in FIG. 2C, varying stepwise at the period or frequency of the clock pulses from the clock generator 4.

The sampled voltage signal $V_c$ thus produced is applied to the operational amplifier 3b, the output of which is the voltage waveform $V_c'$ indicated in FIG. 2C, varying similarly to the sampled voltage signal $V_c$.

The voltage signal $V_c'$ thus produced is further applied to the differential amplifier 5. On the other hand, the output voltage signal $V_s'$ from the buffer amplifier 2 is also applied to the differential amplifier 5, which thus produces a differential output signal $V_I$ corresponding to the difference between the voltage signal $V_s'$ from the intersong sensor 1 and the voltage signal $V_c'$ from the sample-and-hold unit 3 as indicated in FIG. 2D.

The differential signal $V_I$ thus produced is applied to the comparator 6. The threshold voltage value $V_{II}$ is applied from the threshold setting unit to the comparator 6, which thus compares the differential signal $V_I$ from the differential amplifier 5 with the threshold value $V_{II}$. When the signal $V_I$ is higher than the threshold value $V_{II}$, the comparator 9 will produce a pulse-like voltage output signal $V_O$ as indicated in FIG. 2E.

As apparent from the above description and the voltage waveforms indicated in FIGS. 2A through 2E, when the intersong sensor 1 moves from a modulated groove portion to a portion where no such grooves are present on the recording disc, the intersong detecting circuit detects the presence of the intersong interval between by detecting the fact that the voltage of the output signal $V_s$ from the intersong sensor 1 varies greatly within the period of the sampling frequency. If the output signal $V_s$ from the intersong sensor 1 varies greatly during two periods of the sampling frequency, the signal $V_s$ is processed through the buffer amplifier 2, the sample-and-hold unit 3 together with the clock generator 4, the differential amplifier 5 and the comparator 6, and the comparator 6 produces two pulse-like signals $V_O$ for each intersong interval between adjacent songs on the recording disc as indicated in FIG. 2E.

Since the automatic music selecting device, however, operates to select the number of the song by counting the intersong intervals between adjacent songs, if two pulses are generated from the comparator 6 during one intermusic interval between adjacent songs as described above, the automatic music selecting device would operate erroneously.

Figure 3:
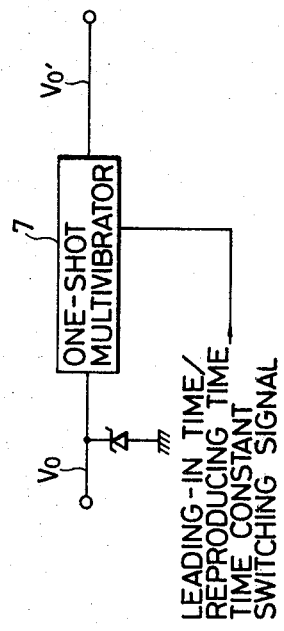
FIG. 3 is a block diagram showing a one-shot multivibrator connected to the output of the intersong detecting circuit of the invention shown in FIG. 1.

Accordingly, as indicated in FIG. 3, there is connected to the output of the comparator 6 a one-shot multivibrator 7 the time constant of which is varied between leading-in times and reproducing times. In response to the two pulse signals applied to the input of the one-shot multivibrator 7, the multivibrator produces a one-pulse output signal $V_O'$ as indicated in FIG. 4B. Thus, the above-described erroneous operation of the intersong detecting circuit is prevented.

If the automatic music selecting device is operating in a playing or reproducing state, the intersong sensor 1 of the automatic music detecting device will produce a voltage signal $V_s$ varying similarly to the voltage signal $V_s'$, as indicated in FIG. 2A', having a small change per unit time, because the sensor 1 then moves slowly along the surface of the recording disc compared with the case of the leading-in time.

In this case, the time constant of the clock generator 4 is switched to cause the generator 4 to produce a clock signal having a longer pulse duration or period compared with the case of the leading-in time so as to lengthen the sampling period of the sample-and-hold unit 3 as indicated in FIG. 2B'. Thus, the signal $V_s$ produced by the sensor 1 is processed through the buffer amplifier 2, the sample-and-hold unit 3 together with the clock generator 4, the differential amplifier 5 and the comparator 6 in the same manner as described above with reference to the waveforms indicated in FIGS. 2A through 2E. In this manner, the sampled voltage signal $V_c'$ is produced from the sample-and-hold unit 3 as indicated in FIG. 3C', and the differential signal $V_I$ is produced from the differential amplifier 5 as indicated in FIG. 2D'. Finally, the comparator 6 produces the output signal $V_O$ as indicated in FIG. 2E'. The operation of the intersong detecting circuit during the reproducing time is conducted in the same manner as that of the intersong detecting circuit during the leading-in-time except that the sampling period of the clock pulses from the clock generator 4 is lengthened, accordingly providing a longer sampling period.

If the sampling period of the clock generator were not switched in the reproducing time of the recording disc in the same manner as in the case of the leading-in time and the same sampling period as that in the case of the leading-in time were used for the reproducing time of the recording disc, the signal $V_s'$ within the period of sampling frequency would have only small variations. Accordingly, the sampled voltage signal $V_c'$ from the sample-and-hold unit 3 would not be sufficiently high and hence the differential signal $V_I$ from the differential amplifier 5 would not sufficiently higher than the threshold value $V_{II}$. Thus, the comparator 6 would produce no pulse signal as indicated in FIG. 2E' thereby indicating no detection of an intersong interval.

It is noted that although the output from the comparator 6 is a signal pulse signal $V_O$ as indicated in FIG. 2E' in the above example, a signal $V_O$ which incorporates two pulses may be produced from the comparator 6 during reproducing times. In this case, the one-shot multivibrator 7 can be connected to the output of the comparator 6 in the same manner as described above for converting the two-pulse signal as indicated in FIG. 4A' into a one-pulse signal $V_O'$ as indicated in FIG. 4B'.

If there is irregularity in the reflectivity of the recording disc, the output signal $V_s$ from the intersong sensor 1 may have beats as indicated in FIG. 5A. If different discs have different reflectivities, the output signals from the sensor 1 may vary as indicated by $V_1$ and $V_2$ in FIG. 5B. However, as according to the present invention, intersong intervals are detected on the basis of variations within the sampling period of the output signal from the sensor 1 by sampling the output signal from the sensor 1 and holding the sampled signal and comparing the sampled signal with the output signal from the sensor 1, intersong intervals are detected by the intersong detecting circuit of the invention without difficulty.

It may be appreciated from the foregoing description that, since in the intersong detecting circuit of the invention the intersong intervals between adjacent songs are detected merely by switching the sampling frequency between leading-in times and reproducing times using a simple circuit, the intersong intervals are detected readily without difficulty even on recording discs having irregular reflectivities or for discs having different reflectivities. Moreover, there is no time delay in detecting the intersong intervals and in reproducing the disc because components causing long time delays are eliminated.

In order to generate the leading-in time/reproducing time time-constant switching signal which is inputted to the clock generator 4, a number of techniques may be employed. In one such technique, a speed detecting section is provided in conjunction with the shaft upon which the tone arm of the record player is mounted. The speed detecting section includes a yoke, a magnet, and a detecting coil interposed between the yoke and the magnet. For instance, the yoke and the magnet may be fixed to the shaft while the coil is positioned on the chassis of the record player at a position where the magnet can pass close thereto as the shaft is rotated.

With this arrangement, the faster the shaft is rotated, and hence the faster the pickup cartridge is moved toward or over the disc, the higher will be the output voltage from the coil. The output voltage from the coil is compared with a predetermined fixed level and an output signal, which is the leading-in time/reproducing time time-constant switching signal, is generated as a result of the comparison. For instance, this signal may assume a high level when the output voltage from the coil exceeds the reference value.

The clock generator is of known construction. For instance, the clock generator may be constituted by a fixed-frequency oscillator the output of which is coupled to the clock input of a counter. The counter is of a multi-bit construction, wherein different output bits of the counter toggle at different frequencies. Monostable multivibrator are coupled at their trigger inputs to two corresponding bit outputs from the counter. The output of the monostable multivibrators are coupled through a gating arrangement wherein one or the other of the outputs of the two multivibrators are selected in accordance with the state of the leading-in time/reproducing time time-constant switching signal. For instance, the gate may implemented by two analog switches having inputs coupled to outputs of the corresponding monostable multivibrators and outputs coupled together. The leading-in time/reproducing time time-constant switching signal is coupled directly to the control input of one of these switches while this signal coupled through an inverter to the control input of the other analog switch.

What is claimed is:

1. An intersong detecting circuit for an automatic music selecting device comprising:

an intersong sensor for detecting intersong intervals between adjacent songs on a recording disc;
   means for sampling an output signal from said intersong sensor at a predetermined rate and holding the sampled signal;
   means responsive to the held signal from said sampling and holding means and to said output from said sensor for comparing said held signal with said output from said sensor to thereby produce a differential signal;
   means responsive to the differential signal from said comparing means for producing an intersong identification signal when said differential signal exceeds a predetermined threshold value; and
   means for switching said sampling rate of said sampling and holding means between leading-in times and reproducing times of said recording disc.

2. The intersong detecting circuit of claim 1 wherein said intersong sensor comprises a phototransistor disposed to receive light reflected from a recording disc.

3. The intersong detecting circuit of claim 1 wherein said sampling and holding means comprises a buffer amplifier receiving said output signal from said intersong sensor; a capacitor having a first terminal coupled to ground; and an FET switching element coupled between an output of said buffer amplifier and a second terminal of said capacitor.

4. The intersong detecting circuit of claim 3 wherein said means for switching said sampling rate of said sampling and holding means comprises a variable frequency clock pulse generator having an output coupled to a control input of said FET switching element, an output frequency of said clock generator being controlled in response to a leading-in time/reproducing time time-constant switching signal.

5. An intersong detecting circuit for an automatic music selecting device comprising: a light emitting diode, light from said light emitting diode being directed onto a surface of a recording disc; a phototransistor having a light input disposed to receive light reflected from said recording disc; a buffer amplifier having an input coupled to an output of said phototransistor; a variable frequency clock generator having a control input coupled to receive a leading-in time/reproducing time time-constant switching signal, an output frequency of said clock generator being determined in accordance with a state of said leading-in time/reproducing time time-constant switching signal; a capacitor having a first terminal coupled to ground; an FET transistor having a first of a source and drain coupled to a second terminal of said capacitor and the other of said source and drain coupled to an output of said buffer amplifier and a gate coupled to an output of said clock generator; a second buffer amplifier having an input coupled to said second terminal of said capacitor; a differential amplifier having a non-inverting input coupled to said output of said first buffer amplifier and an inverting input coupled to an output of said second buffer amplifier; and a comparator having a non-inverting input coupled to an output of said differential amplifier and an inverting input coupled to a source of a predetermined reference voltage.

6. The intersong detecting circuit of claim 5 further comprising a one-shot multivibrator having a trigger input coupled to an output of said comparator and an input for determining a time constant of said one-shot multivibrator coupled to receive said leading-in time/reproducing time time-constant switching signal.

* * * * *